United States Patent
Schulte et al.

(10) Patent No.: US 9,006,329 B2
(45) Date of Patent: Apr. 14, 2015

(54) VINYL ESTER/ETHYLENE COPOLYMER DISPERSIONS FOR USE IN ADHESIVE FORMULATIONS

(75) Inventors: Jörg Schulte, Frankfurt am Main (DE); Alexander Madl, Frankfurt am Main (DE); Hans Uwe Faust, Liederbach (DE)

(73) Assignee: Celanese Emulsions GmbH, Sulzbach (DE)

( * ) Notice: Subject to any disclaimer, the term of this patent is extended or adjusted under 35 U.S.C. 154(b) by 256 days.

(21) Appl. No.: 13/490,514

(22) Filed: Jun. 7, 2012

(65) Prior Publication Data

US 2012/0316282 A1    Dec. 13, 2012

Related U.S. Application Data

(60) Provisional application No. 61/495,774, filed on Jun. 10, 2011.

(51) Int. Cl.
| | | |
|---|---|---|
| C08L 29/04 | (2006.01) | |
| C08F 218/04 | (2006.01) | |
| C08F 261/04 | (2006.01) | |
| C09J 151/06 | (2006.01) | |
| C08F 218/08 | (2006.01) | |

(52) U.S. Cl.
CPC ............ *C08F 218/04* (2013.01); *C08F 261/04* (2013.01); *C09J 151/06* (2013.01); *C08F 218/08* (2013.01); *C08L 2205/025* (2013.01); *C08L 2205/03* (2013.01)

(58) Field of Classification Search
USPC .................................. 524/459, 503; 526/202
See application file for complete search history.

(56) References Cited

U.S. PATENT DOCUMENTS

| | | | |
|---|---|---|---|
| 3,827,996 A | | 8/1974 | Beresniewicz |
| 4,521,561 A | | 6/1985 | Hausman et al. |
| 5,084,503 A | * | 1/1992 | Iacoviello ..................... 524/459 |
| 5,143,966 A | | 9/1992 | Lee et al. |
| 5,629,370 A | | 5/1997 | Freidzon |
| 5,633,334 A | | 5/1997 | Walker et al. |

FOREIGN PATENT DOCUMENTS

EP    0279384 A2    8/1988

OTHER PUBLICATIONS

Sekisu: Celvol Polyvinyl Alcohol: A Versatile Performer in Paper and Paperboard Applications: 2009, pp. 3-4.*
International Search Report and the Written Opinion issued in a corresponding PCT/IB2012/002110 on Dec. 20, 2012.

* cited by examiner

*Primary Examiner* — David W Wu
*Assistant Examiner* — Marie Reddick
(74) *Attorney, Agent, or Firm* — Roberts Mlotkowski Safran & Cole P.C.

(57) ABSTRACT

An aqueous dispersion of a vinyl ester/ethylene copolymer is prepared by emulsion copolymerization of a monomer mixture comprising a vinyl ester, ethylene and a polyvinyl alcohol stabilizing system consisting essentially of (a) about 0.5 to about 3 wt. % based on the total monomer weight of a first polyvinyl alcohol having a degree of hydrolysis of at least 98 mole % and (b) about 1 to about 4 wt. % based on the total monomer weight of a second polyvinyl alcohol having a degree of hydrolysis of about 85 to about 90 mole % and a weight average molecular weight of at least 85,000 g/mol.

14 Claims, No Drawings

VINYL ESTER/ETHYLENE COPOLYMER DISPERSIONS FOR USE IN ADHESIVE FORMULATIONS

FIELD

The present invention relates to aqueous dispersions of vinyl ester/ethylene copolymers and to their use in adhesive formulations.

BACKGROUND

Aqueous dispersions containing copolymers of vinyl esters and ethylene are well known for the production of adhesives for use in the wood, paper and packaging industries. For such uses, it is common to polymerize the comonomers in an aqueous medium containing polymerization initiators and water soluble protective colloids, especially polyvinyl alcohols derived by hydrolysis of polyvinyl acetate. The resulting emulsion polymers can then be formulated with either partially or fully hydrolyzed polyvinyl alcohol to obtain adhesive compositions having varying properties.

For example, U.S. Pat. No. 3,827,996 discloses a process for preparing a stabilized aqueous dispersion of a vinyl ester polymer by copolymerizing, in an aqueous medium, vinyl ester and ethylene in the presence of a partially hydrolyzed polyvinyl alcohol derived from polyvinyl acetate, wherein the polyvinyl alcohol has an average vinyl acetate content of about 5 to 7 mole %, consists essentially of polyvinyl alcohol molecules containing no less than 0.5 mole % and no more than 16 mole % of vinyl acetate and is present in an amount of about 2 to 10 wt % based on the weight of vinyl ester. In Example 1, the polyvinyl alcohol is a blend of polyvinyl alcohol having a vinyl acetate content of 0.5 to 1 mole % and polyvinyl alcohol having a vinyl acetate content of 12 to 16 mole %.

U.S. Pat. No. 4,521,561 discloses a vinyl acetate/ethylene copolymer emulsion which comprises an aqueous colloidal dispersion of a copolymer prepared by the emulsion polymerization of vinyl acetate and ethylene in the presence of a polyvinyl alcohol stabilizing system having an 8 to 10 mole % residual vinyl acetate content, especially comprising a mixture of a polyvinyl alcohol having a 3 to 6 mole % vinyl acetate content and a polyvinyl alcohol having a 10 to 14 mole % vinyl acetate content in a ratio that yields an average residual vinyl acetate content of 8 to 10 mole %. When blended with a partially- or fully-hydrolyzed polyvinyl alcohol, these emulsions are said to provide adhesive compositions with enhanced plasticizer thickening.

U.S. Pat. No. 5,143,966 discloses a vinyl acetate-ethylene copolymer emulsion prepared by the aqueous emulsion copolymerization of vinyl acetate and ethylene in the presence of a polyvinyl alcohol stabilizing system consisting essentially of: (a) 0.2 to 1.5 wt % low molecular weight, partially (85-90 mole %) hydrolyzed polyvinyl alcohol, (b) 0.5 to 2.5 wt % medium molecular weight, partially (85-90 mole %) hydrolyzed polyvinyl alcohol, and (c) 1 to 4 wt % medium molecular weight and/or high molecular weight, fully (98-99+ mole %) hydrolyzed polyvinyl alcohol, the weight percentages based on vinyl acetate monomer.

U.S. Pat, No. 5,633,334 discloses a process for the preparation of emulsion polymers comprising 70 to 95% by weight of a vinyl ester and 5 to 30% by weight ethylene, the polymerization being carried out in the presence of 2 to 8% by weight of a protective colloid consisting of a blend of 1 to 3 percent by weight of 80% hydrolyzed polyvinyl alcohol, 0 to 2 percent by weight of 88% hydrolyzed polyvinyl alcohol and 1 to 3 percent by weight of 96% hydrolyzed polyvinyl alcohol, the blend having an average level of hydrolysis of 85 to 88%. According to the data presented in the Examples, with higher levels of the 96% hydrolyzed polyvinyl alcohol (3.5 to 4 pts) and lower levels of the 80% hydrolyzed polyvinyl alcohol (1 to 1.5 pts), the plasticizer response of the emulsion decreases.

As discussed in certain of the references described above, one important property of a stabilized aqueous dispersion of a vinyl ester/ethylene copolymer for use in an adhesive formulation is its plasticizer response or the increase in the viscosity of the dispersion when mixed with a given amount of plasticizer, such as diisobutyl phthalate (DiBP). This property is generally specified as the Viscosity Increasing Ratio (VIR) and is determined by dividing the viscosity of the dispersion after addition of a specific amount (5, 10 or 15 wt %) of DiBP by the viscosity of the neat dispersion. The property is important since in practice formulators dilute the copolymer dispersion with water and add a plasticizer to produce an adhesive of the desired viscosity so that dispersions with a high VIR reduce the amount of costly and potentially toxic plasticizer required.

According to the present invention, it has now been found that a stabilized aqueous dispersion of a vinyl ester/ethylene copolymer with a high initial viscosity and a high VIR can be produced by conducting the polymerization in the presence of a polyvinyl alcohol stabilizing system consisting essentially of about 0.5 to about 3 wt % of fully (98-99+ mole %) hydrolyzed polyvinyl alcohol and about 1 to about 4 wt % of partially (85-90 mole %) hydrolyzed polyvinyl alcohol having a medium molecular weight and/or high molecular weight, the percentages being based on the total weight of monomers present in the copolymer. Desirably, the dispersion has a low formaldehyde content and a large particle size.

SUMMARY

Thus, in one aspect, the invention resides in an aqueous dispersion of a vinyl ester/ethylene copolymer prepared by emulsion copolymerization of a monomer mixture comprising a vinyl ester, ethylene and a polyvinyl alcohol stabilizing system consisting essentially of (a) about 0.5 to about 3 wt % based on the total monomer weight of a first polyvinyl alcohol having a degree of hydrolysis of at least 98 mole % and (b) about 1 to about 4 wt % based on the total monomer weight of a second polyvinyl alcohol having a degree of hydrolysis of about 85 to about 90 mole % and a weight average molecular weight of at least 85,000 g/mol.

Conveniently, the stabilizing system contains about 1 to about 2 wt % of said first polyvinyl alcohol and generally about 2 to about 3 wt % of a second polyvinyl alcohol. Typically, the second polyvinyl alcohol has a weight average molecular weight of about 85,000 to about 125,000 g/mol.

Conveniently, the dispersion has a Viscosity Increasing Ratio (VIR) of at least 7 when mixed with 10 wt % of diisobutyl phthalate.

Conveniently, the dispersion has a viscosity of at least 4000 mPas at 55% solids and 25° C.

In one embodiment, the dispersion contains less than 10 parts by million (ppm) by weight of formaldehyde and less than 0.5 ppmw surfactant.

Typically, the average particle size of the dispersion is between about 2 and about 10 μm.

Conveniently, the copolymer contains from about 5 to about 25 wt %, such as from about 10 to about 20 wt %, for example from about 14 to about 16 wt %, of units derived from ethylene.

In one embodiment, the vinyl ester comprises a vinyl ester of a $C_1$-$C_{13}$ saturated carboxylic acid, especially vinyl acetate.

DESCRIPTION

Described herein is a stabilized aqueous dispersion of a vinyl ester/ethylene copolymer which has a high initial viscosity and a high Viscosity Increasing Ratio (VIR) making the dispersion attractive for use as a binder in the production of general purpose adhesives.

The "Viscosity Increasing Ratio (VIR)" values referred to herein are determined by dividing the viscosity of the dispersion after mixing with a predetermined amount (10 wt %) of diisobutyl phthalate (DiBP) by the viscosity of the neat dispersion. In particular, the present dispersion has a VIR of at least 7 when mixed with 10 wt % of DiBP.

The present vinyl ester/ethylene copolymer is produced by emulsion polymerization of a monomer mixture comprising a vinyl ester, ethylene, one or more optional co-monomers and a specific polyvinyl alcohol stabilizing system.

The vinyl ester employed is generally a vinyl ester of a saturated carboxylic acid having 1 to 13, typically 2 to 8, carbon atoms, especially vinyl acetate. The vinyl ester is typically present in amount between about 75 wt % and about 95 wt % based on the total weight of monomers. The ethylene component is generally present in an amount from about 5 to about 25 wt %, such as from about 10 to about 20 wt %, for example from about 14 to about 16 wt %, of the total monomer weight.

In addition to a vinyl ester and ethylene, the monomer mixture may include one or more additional functional monomers added to improve the properties of the final copolymer dispersion. Such optionally present, functional co-monomers can include ethylenically unsaturated acids, e.g. mono- or di-carboxylic acids, sulfonic acids or phosphonic acids. In place of the free acids, it is also possible to use their salts, preferably alkali metal salts or ammonium salts. Examples of optional functional co-monomers of this type include acrylic acid, methacrylic acid, crotonic acid, maleic acid, fumaric acid, itaconic acid, vinylsulfonic acid, vinylphosphonic acid, styrenesulfonic acid, monoesters of maleic and/or fumaric acid, and of itaconic acid, with monohydric aliphatic saturated alcohols of chain length $C_1$-$C_{18}$, and also their alkali metal salts and ammonium salts, or (meth)acrylic esters of sulfoalkanols, an example being sodium 2-sulfoethyl methacrylate.

Other types of suitable optional functional co-monomers include ethylenically unsaturated co-monomers with at least one amide-, epoxy-, hydroxyl, trialkoxysilane- or carbonyl group. Particularly suitable are ethylenically unsaturated epoxide compounds, such as glycidyl methacrylate or glycidyl acrylate. Also suitable are hydroxyl compounds including methacrylic acid and acrylic acid $C_1$-$C_9$ hydroxyalkyl esters, such as n-hydroxyethyl, n-hydroxypropyl or n-hydroxybutyl acrylate and methacrylate. Other suitable functional co-monomers include compounds such as diacetone acrylamide and acetylacetoxyethyl acrylate and methacrylate; and amides of ethylenically unsaturated carboxylic acids, such as acrylamide or meth acrylamide.

One type of functional co-monomer which should not be incorporated into the vinyl acetate/ethylene copolymers used herein comprises any co-monomer which contains cross-linkable moieties that generate formaldehyde upon formation of the coating or adhesive layer from compositions containing such copolymers. Thus the vinyl acetate/ethylene copolymer in the copolymer dispersion should be substantially free of such co-monomers, which include, for example, common cross-linkers like N-methylolacrylamide (NMA) or even low formaldehyde versions of N-methylolacrylamide such as NMA-LF.

Optional functional co-monomers can be incorporated into the vinyl acetate/ethylene emulsion copolymers used herein in amount of up to about 5 wt %, based on total main co-monomers in the copolymer. More preferably, optional functional co-monomers can comprise from about 0.5 wt % to about 2 wt %, based on total main co-monomers in the copolymer.

The stabilizing system employed to produce the present copolymer dispersion is a two component system consisting essentially of (a) about 0.5 to about 3 wt %, such as contains about 1 to about 2 wt %, based on the total monomer weight of a first polyvinyl alcohol having a degree of hydrolysis of at least 98 mole % and (b) about 1 to about 4 wt %, such as about 2 to about 3 wt %, based on the total monomer weight of a second polyvinyl alcohol having a degree of hydrolysis of about 85 to about 90 mole % and a weight average molecular weight of at least 85,000 g/mol, such as about 85,000 to about 125,000 g/mol. One example of a commercially available polyvinyl alcohol having a degree of hydrolysis of at least 98 mole % is Celvol 107 supplied by Sekisui Chemical Company Ltd. One example of commercially available polyvinyl alcohol having a degree of hydrolysis of about 85 to about 90 mole % and a weight average molecular weight of at least 85,000 g/mol is Celvol 523, again supplied by Sekisui Chemical Company Ltd.

The stabilized copolymer dispersions described herein can be prepared using emulsion polymerization procedures which result in the preparation of polymer dispersions in aqueous latex form. Such preparation of aqueous polymer dispersions of this type is well known and has already been described in numerous instances and is therefore known to the skilled artisan. Such procedures are described, for example, in U.S. Pat. No. 5,633,334, and in the *Encyclopedia of Polymer Science and Engineering, Vol.* 8, p. 659 ff (1987). The disclosures of both of these publications are incorporated herein by reference in their entirety.

The polymerization may be carried out in any manner known per se in one, two or more stages with different monomer combinations, giving polymer dispersions having particles with homogeneous or heterogeneous, e.g., core shell or hemispheres, morphology. Any reactor system such as batch, loop, continuous, cascade, etc, may be employed.

The polymerization temperature generally ranges from about 20° C. to about 150° C., more preferably from about 50° C. to about 120° C. The polymerization generally takes place under pressure if appropriate, preferably from about 2 to about 150 bar, more preferably from about 5 to about 100 bar.

In a typical polymerization procedure involving, for example, vinyl acetate/ethylene copolymer dispersions, the vinyl acetate, ethylene, stabilizing system and other co-monomers can be polymerized in an aqueous medium under pressures up to about 120 bar in the presence of one or more initiators. The aqueous reaction mixture in the polymerization vessel can be maintained by a suitable buffering agent at a pH of about 2 to about 7.

The manner of combining the several polymerization ingredients, i.e., stabilizing system, co-monomers, catalyst system components, etc., can vary widely. Generally an aqueous medium containing at least part of the stabilizing system can be initially formed in a polymerization vessel with the various other polymerization ingredients being added to the vessel thereafter.

Co-monomers can be added to the polymerization vessel continuously, incrementally or as a single charge addition of the entire amounts of co-monomers to be used. Co-monomers can be employed as pure monomers or can be used in the form of a pre-mixed emulsion. Ethylene as a co-monomer can be pumped into the polymerization vessel and maintained under appropriate pressure therein.

As noted, the polymerization of the ethylenically unsaturated monomers will generally take place in the presence of at least one initiator for the free-radical polymerization of these co-monomers. Suitable initiators for the free-radical polymerization, for initiating and continuing the polymerization during the preparation of the dispersions, include all known initiators which are capable of initiating a free-radical, aqueous polymerization in heterophase systems. These initiators may be peroxides, such as alkali metal and/or ammonium peroxodisulfates, or azo compounds, more particularly water-soluble azo compounds.

In a preferred embodiment, a redox initiator is used. Examples of such initiators include an oxidizing component, such as tert-butyl hydroperoxide and/or hydrogen peroxide, in combination with a reducing agent, such as with sulfur compounds, an example being the sodium salt of hydroxymethanesulfinic acid, Brüggolit FF6 and FF7, sodium sulfite, sodium disulfite, sodium thiosulfate, and acetone-bisulfite adduct, or with ascorbic acid or with reducing sugars.

The amount of the initiators or initiator combinations used in the process varies within what is usual for aqueous polymerizations in heterophase systems. In general the amount of initiator used will not exceed 5% by weight, based on the total amount of the co-monomers to be polymerized. The amount of initiators used, based on the total amount of the co-monomers to be polymerized, is preferably 0.05% to 2.0% by weight.

In this context, it is possible for the total amount of initiator to be included in the initial charge to the reactor at the beginning of the polymerization. Preferably, however, a portion of the initiator is included in the initial charge at the beginning, and the remainder is added after the polymerization has been initiated, in one or more steps or continuously. It is also possible to start the emulsion polymerization using a seed latex, for example with about 0.5 to about 15% by weight of the polymerization mixture.

The copolymer dispersions as prepared herein will generally have a viscosity of at least 4,000 mPas, such as about 4,000 mPas to about 20,000 mPas at 55% solids and 25° C., as measured with a Brookfield viscometer at 20 rpm, with appropriate spindle. Viscosity may be adjusted by the addition of thickeners and/or water to the copolymer dispersion. Suitable thickeners can include polyacrylates or polyurethanes, such as Borchigel L75® and Tafigel PUR 60®. Alternatively, the copolymer dispersion may be substantially free of thickeners.

Following polymerization, the solids content of the resulting aqueous copolymer dispersions can be adjusted to the level desired by the addition of water or by the removal of water by distillation. Generally, the desired level of polymeric solids content after polymerization is from about 40 weight percent to about 70 weight percent based on the total weight of the polymer dispersion, more preferably from about 45 weight percent to about 55 weight percent.

When formulated into adhesives, the aqueous vinyl ester/ethylene copolymer dispersions described herein may be combined with additives which are typical for use in the production of dispersion-based adhesives. Suitable additives include, for example, film-forming assistants, such as white spirit, Texanol®., TxiB®., butyl glycol, butyldiglycol, butyldipropylene glycol, and butyltripropylene glycol, toluene; plasticizers, such as dimethyl phthalate, dibutyl phthalate, diisobutyl phthalate, diisobutyl adipate, Coasol B®, Plastilit 3060®, and Triazetin®; wetting agents, such as AMP 90®, TegoWet.280®., Fluowet PE®; thickeners, such as polyacrylates or polyurethanes, such as Borchigel L759®. and Tafigel PUR 60®; defoamers, such as mineral oil defoamers or silicone defoamers; UV protectants, such as Tinuvin 1130®), subsequently added stabilizing polymers, such as polyvinyl alcohol or cellulose ethers, and other additives and auxiliaries of the kind typical for the formulation of adhesives.

The fraction of these additives in the final dispersion-based adhesive can be up to 25% by weight, preferably 2% to 15% by weight, and in particular 5% to 10% by weight, based on the dispersion.

Examples of suitable substrates that can be bonded using the present adhesive include metals, plastics, paint surfaces, paper, textiles, nonwovens or natural substances, such as wood. The substrates to be bonded may possess absorbent surfaces or hydrophobic surfaces. Examples of absorbent surfaces are papers, including paperboard and cardboard, and other fiber webs. Examples of hydrophobic surfaces are polymeric films (e.g., polyester film, polyolefin film such as polypropylene or polyethylene, for example, polystyrene film, acetate film) or papers with a UV varnish coating. Any desired combination may occur in practice.

The invention will now be more particularly described with reference to the following non-limiting Examples.

PREPARATION EXAMPLES 1 TO 20

A 28 liter pressure vessel equipped with a stirrer was charged with the following:
  6.7 kg water
  5 g Sodium acetate
  Celvol 107 or 205 (amount and type as specified in Table 1)
  Celvol 523 (amount as specified in Table 1)
  Orotan 850 ER polycarboxylic acid dispersant (amount as specified in Table 1)
  45 g Phosphoric acid (85% in water)
  1 g Ferric (III) chloride (40% in water).

The vessel was evacuated and flushed with nitrogen, the stirrer was turned on and the vessel was charged with the following:
  6 kg Vinyl acetate
  2.3 kg of Ethylene Two separate addition vessels were charged with solutions of the following:
Vessel 1: Reducer
  0.6 kg Water
  28 g Brueggolit FF6® (sodium salt of an organic sulfinic acid derivative)
  9 g Sodium acetate and
Vessel 2: Oxidizer
  0.6 kg water
  46 g tert-Butylhydroperoxide (70% in water)

Polymerization was carried out at 85° C. by adding each of the reducer and oxidizer to the reactor over a period of 240 minutes, and simultaneously adding 6 kg of vinyl acetate over a period of 100 minutes. The resultant batch was transferred to a post-treatment vessel, where the batch was post-treated by subsequently adding the following solutions from separate addition vessels to the post-treatment vessel over a period of 15 minutes:

Vessel 3: Reducer
    0.2 kg Water
    8 g Brueggolit FF6®
    7 g Sodium bicarbonate and
Vessel 4: Oxidizer
    0.1 kg water
    3 g tert-Butylhydroperoxide (70% in water)
    7 g Hydrogen peroxide (35% in water)

After the addition of 5 g of the defoamer Agitan DF 6575 GM, the batch was discharged into a container and the solids level was adjusted to 55%. The initial viscosity and VIR at 10 wt % DiBP plasticizer of each batch were then tested and the results are summarized in Table 1.

PREPARATION EXAMPLE 21

The process of Example 11 was repeated but the amounts of oxidizer and reducer added during the main polymerization step were increased as follows:
Vessel 1: Reducer
    0.68 kg Water
    31.5 g Brueggolit FF6® (sodium salt of an organic sulfinic acid derivative)
    10.1 g Sodium acetate and
Vessel 2: Oxidizer
    0.68 kg water
    51.8 g tert-Butylhydroperoxide (70% in water)

The amounts of oxidizer and reducer used during the post-treatment were the same as in Example 11.

Again the results are summarized in Table 1.

TABLE 1

| Example | Celvol Type | Amount of C523 [pphm] | Amount of Orotan 850 [pphm] | Amount of C107 or C205 [pphm] | VIR @ 10% plasticizer | Initial viscosity |
|---|---|---|---|---|---|---|
| 1 | 205 | 2 | 0.081 | 2 | 5.1 | 5930 |
| 2 | 205 | 2 | 0.027 | 2 | 5.5 | 6220 |
| 3 | 107 | 2.25 | 0.054 | 1.75 | 6.2 | 3940 |
| 4 | 205 | 2.25 | 0.054 | 1.75 | 5.4 | 5953 |
| 5 | 107 | 2 | 0.027 | 2 | 8.1 | 1507 |
| 6 | 205 | 2.5 | 0.081 | 1.5 | 4.4 | 4060 |
| 7 | 107 | 2.5 | 0.081 | 1.5 | 7.2 | 3987 |
| 8 | 205 | 2.5 | 0.027 | 1.5 | 5.3 | 7350 |
| 9 | 107 | 2.5 | 0.027 | 1.5 | 7.2 | 4060 |
| 10 | 107 | 2 | 0.081 | 2 | 7.5 | 2700 |
| 11 | 107 | 2.5 | 0.2 | 1.5 | 8.3 | 4933 |
| 11** | 107 | 2.5 | 0.2 | 1.5 | 7.3 | 4533 |
| 12 | 107 | 2.5 | 0.081 | 1.5 | 7.6 | 4506 |
| 13 | 107 | 3 | 0.081 | 1 | 7.3 | 8856 |
| 14 | 107 | 2.5 | 0.2 | 1.5 | 8 | 5546 |
| 15 | 107 | 3 | 0.081 | 1 | 4.9 | 12866 |
| 16 | 107 | 2.75 | 0.1405 | 1.25 | 6.4 | 9967 |
| 17 | 107 | 3 | 0.2 | 1 | 6.8 | 7300 |
| 18 | 107 | 3 | 0.2 | 1 | 6.1 | 7573 |
| 19 | 107 | 2.5 | 0.081 | 1.5 | 8.1 | 4393 |
| 20 | 107 | 2.75 | 0.1405 | 1.25 | 7 | 6786 |
| 21 | 107 | 2.5 | 0.2 | 1.5 | 7.4 | 5033 |

*pphm = parts/hundred total monomer
**Repeat of Example 11

TESTING EXAMPLES 22 TO 24

The products of Examples 11 and 11 (Repeat) were subjected to the following tests in comparison with the commercial adhesive Celvolit® CP 149 and the results are summarized in Tables 2 and 3:

Solids content

Heat resistance—this test involves applying a 75 μm thick coating of the relevant adhesive to a first paper sheet and then immediately laminating the first paper sheet to a second paper sheet with the help of a roller. After leaving the laminate to dry for at least 24 hours at 20° C., 2.5 cm wide test strips are cut from the laminate and placed in an oven. With one sheet of each laminated test strip being clamped and the other sheet being attached to a 200 g free weight, the temperature of the oven is increased from 30° C. at a rate of 5° C. every 30 minutes. The temperature at which the adhesive no longer holds the paper sheets together, so that the weight falls, is noted (180° angle of peel) and indicated in Table 2.

Brookfield Viscosity at 25° C. both initially and after various stand times.

Viscosity Response with 10% DiPB plasticizer.

Wet tack and setting on Fipago—with the Example 11/10% DiBP dispersion being diluted to 7200 mPas with 4.71% distilled water and the Example 11 (Repeat)/10% DiBP dispersion being diluted to 7160 mPas with 4.32% distilled water. In this test, a 100 μm thick coating of the relevant adhesive is applied to a paper sheet and, after 10 seconds, the paper sheet is laminated to a cardboard sheet with the help of a roller. After a defined closed time (starting at 1 second), a pendulum attached to the paper sheet is released and the force necessary to separate the paper from the cardboard is measured (90° angle of peel). By gradually increasing the closed time and measuring the peeling force, it is possible to determine the wet tack development of the adhesive with time.

Rheology flow curve determined by Physica Rheolab MC 100, MS-Z4, DIN/SM 0-1000 1/s, Ramps 1-5-1min—with Celvolit/DiPB dispersion being diluted to 5510 mPas with 4.27% distilled water, the Example 11/10% DiBP dispersion being diluted to 7200 mPas with 4.71% distilled water and the Example 11 (Repeat)/10% DiBP dispersion being diluted to 7160 mPas with 4.32% distilled water.

Particle size distribution using a Malvern Mastersizer Microplus.

Adhesion to the following plastic substrates Genotherm GA 66 (PVC), Melinex (PET) and Acetat N 50 (cellulose acetate)—this test involves applying a 75-100 μm thick wet coating of the relevant adhesive to a paper or cardboard sheet and then immediately laminating a film of the plastic substrate to the paper sheet with the help of a roller. The resultant laminate is stored in a climate controlled room for at least 3 days and then the adhesion properties of the laminate are determined by a manual peel test (90° and 180° angle of peel). The semi-quantitative results given in Table 3 use the following ratings: 100 means full fiber tear of the paper sheet, 0 means no adhesion between the substrates and 0 zipping means the substrates have no adhesion and no cohesion.

While the present invention has been described and illustrated by reference to particular embodiments, those of ordinary skill in the art will appreciate that the invention lends itself to variations not necessarily illustrated herein. For this reason, then, reference should be made solely to the appended claims for purposes of determining the true scope of the present invention.

TABLE 2

| | Adhesive | | | | | |
|---|---|---|---|---|---|---|
| | Celvolit CP 149 | Celvolit CP 149 + 10% DiBP | Example 11 | Example 11 + 10% DiBP | Example 11 (Repeat) | Example 11 (R) + 10% DiBP |
| Solid content [%] | 54.89 | — | 55.26 | — | 55.20 | — |
| Heat resistance [° C.] | >100 | 85 | 85 | 55 | 85 | 65/70 |
| Viscosity [mPas] (Start) | 4800 (BF4/20) | — | 5570 (BF4/20) | — | 5180 (BF4/20) | — |
| Viscosity [mPas] (after 30 mins stirring) | 4800 (BF4/20) | — | 5500 (BF4/20) | — | 5010 (BF4/20) | — |
| Viscosity [mPas] (after 1 day standing) | 5270 (BF4/20) | — | 5620 BF4/20) | — | 4960 (BF4/20) | — |
| Viscosity [mPas] (after 3 days standing) | 5270 (BF4/20) | — | 5370 (BF4/20) | — | 4910 (BF4/20) | — |
| Viscosity [mPas] (directly after addition of DiBP) | — | 15140 (BF5/20) | — | 34950 (BF6/20) | — | 29650 (BF6/20) |
| Response Factor | — | 3.15 | — | 6.27 | — | 5.72 |
| Viscosity [mPas] (after 1 day) | — | 17100 (BF6/20) | — | 37450 (BF6/20) | — | 31550 (BF6/20) |
| Wet tack and setting on Fipago | | | | | | |
| closed waiting time 1 sec | 5 | 7 | 3 | 4 | 3 | 5 |
| closed waiting time 2 sec | 6 | 9 | 3 | 4 | 3 | 5 |
| closed waiting time 3 sec | 7 | 11 | 4 | 5 | 3 | 6 |
| closed waiting time 5 sec | 8 | 16 | 4 | 9 | 4 | 8 |
| closed waiting time 7 sec | 9 | 23 | 7 | 15 | 6 | 13 |
| closed waiting time 10 sec | 16 | 36 | 10 | 22 | 8 | 20 |
| closed waiting time 15 sec | 37 | — | 19 | 37 | 22 | 43 |
| closed waiting time 20 sec | — | — | 35 | — | 44 | — |
| closed waiting time 25 sec: | | | 45 | | | |

TABLE 3

| | Adhesive | | | | | |
|---|---|---|---|---|---|---|
| | Celvolit CP 149 | Celvolit CP 149 + 10% DiBP | Example 11 | Example 11 + 10% DiBP | Example 11 (Repeat) | Example 11 (R) + 10% DiBP |
| Rheology flow curve | | | | | | |
| Eta up (300 l/s) [Pas] | 1.86 | 1.70 | 1.36 | 2.35 | 1.67 | 2.47 |
| Eta down (300 l/s) [Pas] | 1.87 | 1.43 | 1.23 | 1.04 | 1.11 | 1.17 |
| Eta up/Eta down (300 l/s) | 0.99 | 1.19 | 1.11 | 2.26 | 1.50 | 2.11 |
| Eta up (1000 l/s) [Pas] | 1.26 | 1.02 | 0.85 | 0.94 | 0.87 | 0.89 |
| Eta after 5' (1000 l/s) [Pas] | 1.28 | 0.92 | 0.76 | 0.59 | 0.76 | 0.77 |
| Eta up/Eta after 5' (1000 l/s) | 0.98 | 1.11 | 1.12 | 1.59 | 1.15 | 1.16 |
| rheological factor: Eta up (300 l/s)/ Eta up (1000 l/s) | 1.48 | 1.67 | 1.59 | 2.49 | 1.91 | 2.77 |
| Particle size distribution | | | | | | |
| dn [μm] | 0.33 | — | 0.83 | — | 0.94 | |
| dw [μm] | 1.92 | — | 5.37 | — | 3.86 | |
| dw/dn | 5.848 | — | 6.460 | — | 4.089 | |
| Adhesion to plastic substrates | | | | | | |
| Genotherm GA 66 (PVC) [%] | 0 | 100 | 0 | 100 | 0 | 100 |
| Melinex (PET) [%] | 0 | 0 zipping | 0 | 0 zipping | 0 | 0 zipping |
| Acetat N 50 (CA) [%] | 0 zipping | 100 | 0 zipping | 100 | 100 | 100 |

The invention claimed is:

1. An aqueous dispersion of a vinyl ester/ethylene copolymer prepared by emulsion copolymerization of a monomer mixture comprising a vinyl ester and ethylene, less than 0.5 ppmw of a surfactant, and a polyvinyl alcohol stabilizing system consisting essentially of (a) about 0.5 to about 3 wt. % based on the total monomer weight of a first polyvinyl alcohol having a degree of hydrolysis of at least 98 mole %, and (b) about 1 to about 4 wt. % based on the total monomer weight of a second polyvinyl alcohol having a degree of hydrolysis of about 85 to about 90 mole % and a weight average molecular weight of at least 85,000 g/mol.

2. The dispersion of claim 1, wherein the stabilizing system contains about 1 to about 2 wt. % of said first polyvinyl alcohol based on the total monomer mixture.

3. The dispersion of claim 1, wherein the stabilizing system contains about 2 to about 3 wt. % of a second polyvinyl alcohol based on the total monomer mixture.

4. The dispersion of claim 1, wherein the second polyvinyl alcohol has a weight average molecular weight of about 85,000 to about 125,000 g/mol.

5. The dispersion of claim 1 and having a Viscosity Increasing Ratio (VIR) of at least 7 when mixed with 10 wt. % of diisobutyl phthalate.

6. The dispersion of claim 1 and having a viscosity of at least 4000 mPas at 55% solids and 25° C.

7. The dispersion of claim 1 and containing less than 10 ppmw formaldehyde.

8. The dispersion of claim 1 and having an average particle size between about 2 and about 10 μm.

9. The dispersion of claim 1, wherein the copolymer contains from about 5 to about 25 wt. % of units derived from ethylene.

10. The dispersion of claim 1, wherein the copolymer contains from about 10 to about 20 wt. % of units derived from ethylene.

11. The dispersion of claim 1, wherein the copolymer contains from about 14 to about 16 wt. % of units derived from ethylene.

12. The dispersion of claim 1, wherein the vinyl ester comprises a vinyl ester of a $C_1$-$C_{13}$ saturated carboxylic acid.

13. The dispersion of claim 1, wherein the vinyl ester comprises vinyl acetate.

14. An adhesive formulation comprising the aqueous dispersion of claim 1.

* * * * *